Oct. 4, 1966  W. E. WALKER  3,276,712
REEL STANDS

Filed May 13, 1964  2 Sheets-Sheet 1

INVENTOR
W. E. Walker
BY
ATTORNEY

Oct. 4, 1966     W. E. WALKER     3,276,712

REEL STANDS

Filed May 13, 1964     2 Sheets-Sheet 2

INVENTOR
W. E. Walker
BY
ATTORNEY

United States Patent Office 3,276,712
Patented Oct. 4, 1966

3,276,712
REEL STANDS
William Edward Walker, Stansted, Essex, England, assignor to Walker (Enfield) Limited, Enfield, England
Filed May 13, 1964, Ser. No. 366,974
Claims priority, application Great Britain, May 13, 1963, 19,954/63
3 Claims. (Cl. 242—64)

This invention relates to reel stands of the type employed for supporting a reel of paper or like material during feeding of the web to a processing machine, such as a printing machine. To enable the supply of the paper or other material to be transferred easily and quickly from a depleted reel to a fresh reel, reel stands are frequently arranged to have three or more reel carriers disposed about an axis of rotation; the reel from which the web is being supplied to the machine is then supported from one reel carrier and the next reel to be used can be placed on another reel carrier so that, on depletion of the first reel, the next reel may be brought into the feed position simply by turning the reel stand about its axis of rotation.

Because the reel carriers move in a circular path in a vertical plane, it is necessary to clamp the reel in the reel carrier as otherwise the reel will fall from the carrier in certain positions of the stand. The need to clamp each reel in this way and subsequently to release the reel from the carrier when the web is depleted results in wastage of time and labor.

In the present invention, a reel stand has a plurality of reel carriers so supported on a rotary structure that, during rotation of the structure, each reel carrier maintains a substantially constant attitude to the vertical whereby the need for clamping the reels in the carriers is obviated.

According to a preferred form of the invention, a reel stand has two similar supporting structures, each comprising a pair of rotatable members mounted for rotation about non-coincident but parallel horizontal axes and a series of reel carriers pivotally secured to both members at similarly non-coincident horizontal axes, so that on rotation of the members together about their respective axes the carriers maintain substantially constant attitudes to the vertical; the two structures are spaced apart in the direction of the axes and the reel carriers are aligned with those of the other structure whereby a reel may be rotatably supported in a pair of aligned reel carriers. In the use of such a reel stand, the reels may for example be simply slid into a pair of aligned carriers without the need for clamping.

Figure 1:
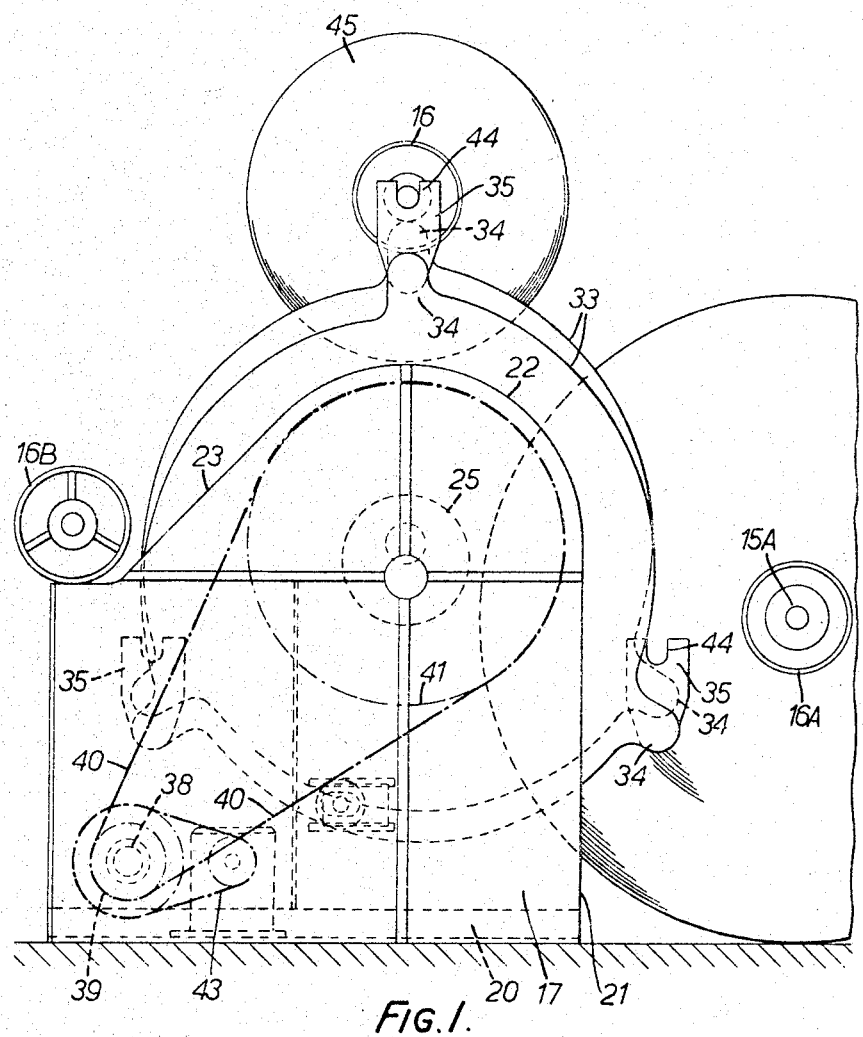
Figure 2:
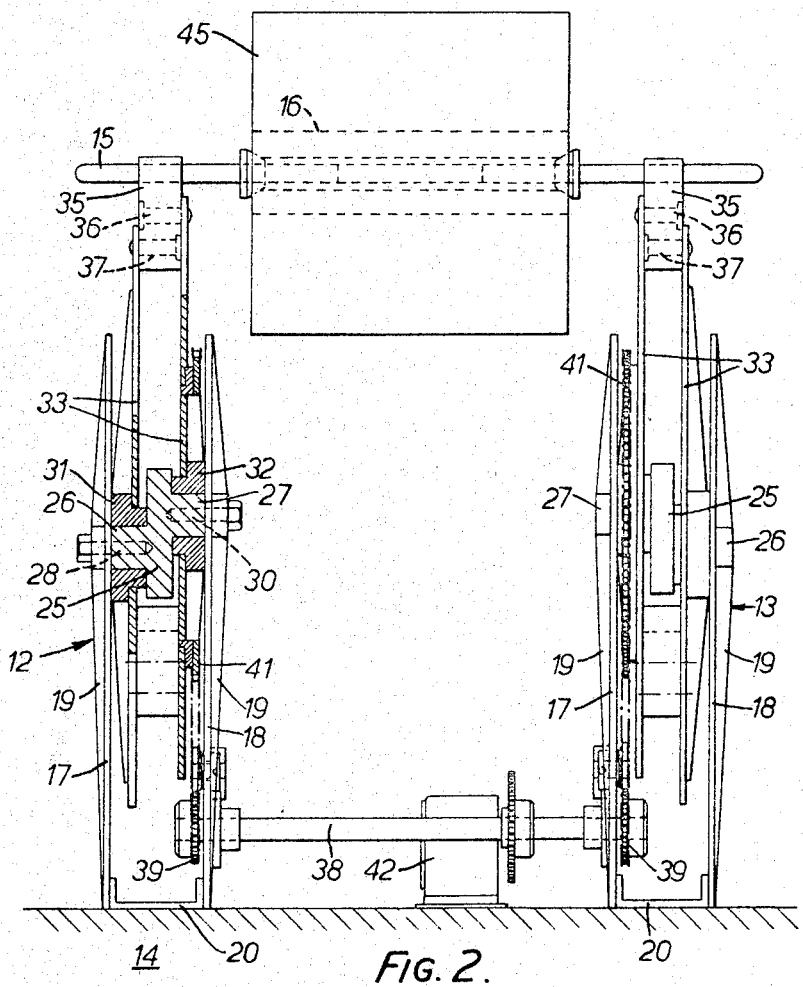

The invention will be more readily understood by way of example from the following description of a reel stand in accordance therewith, reference being made to the accompanying drawings in which FIGURE 1 is a side view of the stand, and
FIGURE 2 is an end view of the stand, part being shown in cross-section.

The reel stand shown in the drawings comprises a pair of structures 12, 13 secured to a base 14 and spaced apart by a distance somewhat less than the length of the spindles 15 of the reels 16 to be supported.

Each structure 12, 13 has a pair of parallel vertical plates 17, 18 which are braced together at the bottom by a channel member 20 welded or otherwise secured to the base 14 and which are strengthened by webs 19. As shown in FIGURE 1, each plate 17, 18 has a vertical edge 21 leading from the base 14 to a part-circular edge 22 ending in an inclined edge 23.

Each structure 12, 13 has additionally a similar journal block 25 having two journals 26, 27 secured to the plates 17, 18 by bolts 28, 30 respectively. The journals 26, 27 are offset vertically, i.e. their horizontal axes are spaced apart vertically. The journals 26, 27 carry bearings 31, 32 respectively to each of which is fixed an approximately circular plate 33 centered on the axis of its journal 26 or 27 and having a number of integral projecting ears 34 spaced equally about the journal; three such ears 34 are illustrated. The ears 34 of the two plates 33 are approximately aligned and carry between them reel carrier blocks 35 which are independently pivoted to the two plates 33 by pivot pins 36, 37. The pins 36, 37 are spaced apart vertically by the same separation as the axes of the journals 26, 27 so that when the plates 33 turn together on their offset journals 26, 27 the blocks 35 maintain a constant attitude to the vertical.

A drive shaft 38 is carried in bearings in the plate 18 of structure 12 and the plate 17 of structure 13 so as to be parallel to the axes of the journals 26, 27. Shaft 38 carries two sprockets 39 which drive through chains 40 to sprockets 41 fast on the two inner plates 33. Shaft 38 can be driven by a motor 42 through a gearing or through a chain or belt 43 as illustrated in order to rotate the plates 33 and hence the carrier blocks 35.

Each carrier block 35 in one structure 12 is aligned circumferentially with a corresponding block 35 in the other structure 13. Each block 35 is also formed with an open-topped slot 44 designed to receive and support one end of a spindle 15. For this purpose the spindles 15 may carry their own bearings.

In operation, the plates 33 are disposed with a pair of aligned carrier blocks 35 uppermost and with the ends of the spindle 15 of a first reel 16 located in the slots 44 of those blocks. The web 45 is drawn off that reel to the processing machine, the spindle 15 and hence the reel 16 rotating in the slots 44. When the web 45 is nearing exhaustion, a fresh reel 16A is rolled into position with the protruding ends of its spindle 15A located immediately above the slots 43 of the next pair of carrier blocks 35, as shown at the right of the stand in FIGURE 1. When the web of the first reel 16 is exhausted or is nearing exhaustion, the shaft 38 is turned by the motor 42 to rotate the plates 33 so that the next carrier block 35 collects the shaft 15A and lifts the reel 16A. The motor is driven to rotate the plates 33 through 120° with the result that the reel 16A is brought into the uppermost position for feeding the web to the machine. During the rotary movement of the plates 33, the blocks 35 maintain their vertical attitude with the slots 44 vertical so that there is no danger of the reel 16A falling from the carrier blocks regardless of the fact that the reel is not clamped to those blocks. Also during that movement, the expended reel 16, while moving to the left as viewed in FIGURE 1, is engaged by the inclined edges 23 of the plates 17 and 18 and is thereby automatically removed upwardly from the slots 44 and allowed to fall clear of the stand for subsequent collection; such an expended reel is indicated at 16B in FIGURE 1.

In some cases, the planes through the axes of the journals 26, 27 and through the axes of the pins 36, 37 may be inclined slightly to the vertical so that the carriers 35 are similarly maintained inclined to the vertical. This arrangement may facilitate the pick-up of new reels 15A, 16A by the reel stand.

It will be seen that by virtue of the constantly vertical or near vertical attitude of the carrier blocks, clamping of the reels in the carrier blocks and release of the reels therefrom are avoided, the expended carriers being automatically removed from the stand on bringing the next reel into operative position. Furthermore, the absence of any central shaft extending between the two sets of plates 33 avoids any undue restriction in the diameters of the reels that can be accepted by the reel stand; if such a shaft were present, the reels would be limited to those having radii less than the distance between the shaft and the spindle carrier blocks.

I claim:

1. A reel stand comprising two horizontally spaced supports, a journal block carried by each support, each journal block comprising two parallel journals and each journal being positioned in alignment with one of the journals in the other block, an individual rotatable member rotatably mounted on each journal of each block, common drive means for rotating said rotatable members, and a reel carrier for each support, each reel carrier having an upwardly opening slot and being pivotally attached to both of the two rotatable members supported on that support by pivot means parallel to said journals, the distance between the journal and pivot means on each rotatable member being equal to the corresponding distance on the other rotatable members, whereby the slot in each reel carrier is maintained in said upwardly opening position by said rotatable members as they are driven in rotation, each slot in a reel carrier supported by one of said supports being aligned with a slot in a reel carrier supported by the other support so that a reel may be rotatably supported between each pair of aligned slots.

2. A reel carrier as claimed in claim 1, in which each support comprises two horizontally spaced upright members between which the corresponding journal block is mounted.

3. A reel carrier as claimed in claim 1 in which said supports are provided with sloping surfaces positioned in the path of travel of a descending reel supported in a pair of aligned slots, said surfaces acting to lift said reel out of its slots, and guide it away from said stand.

References Cited by the Examiner

UNITED STATES PATENTS

| | | | |
|---|---|---|---|
| 1,679,343 | 8/1928 | Aldrich | 242—64 |
| 2,060,360 | 11/1936 | Wood | 242—64 |
| 2,590,384 | 3/1952 | Dent et al. | 242—55.3 |
| 2,658,691 | 11/1953 | Mallory | 242—64 |
| 2,716,437 | 8/1955 | Wikle | 242—64 X |

FOREIGN PATENTS 7,623     1898     Great Britain.

FRANK J. COHEN, *Primary Examiner.*

MERVIN STEIN, W. S. BURDEN, *Assistant Examiners.*